UNITED STATES PATENT OFFICE.

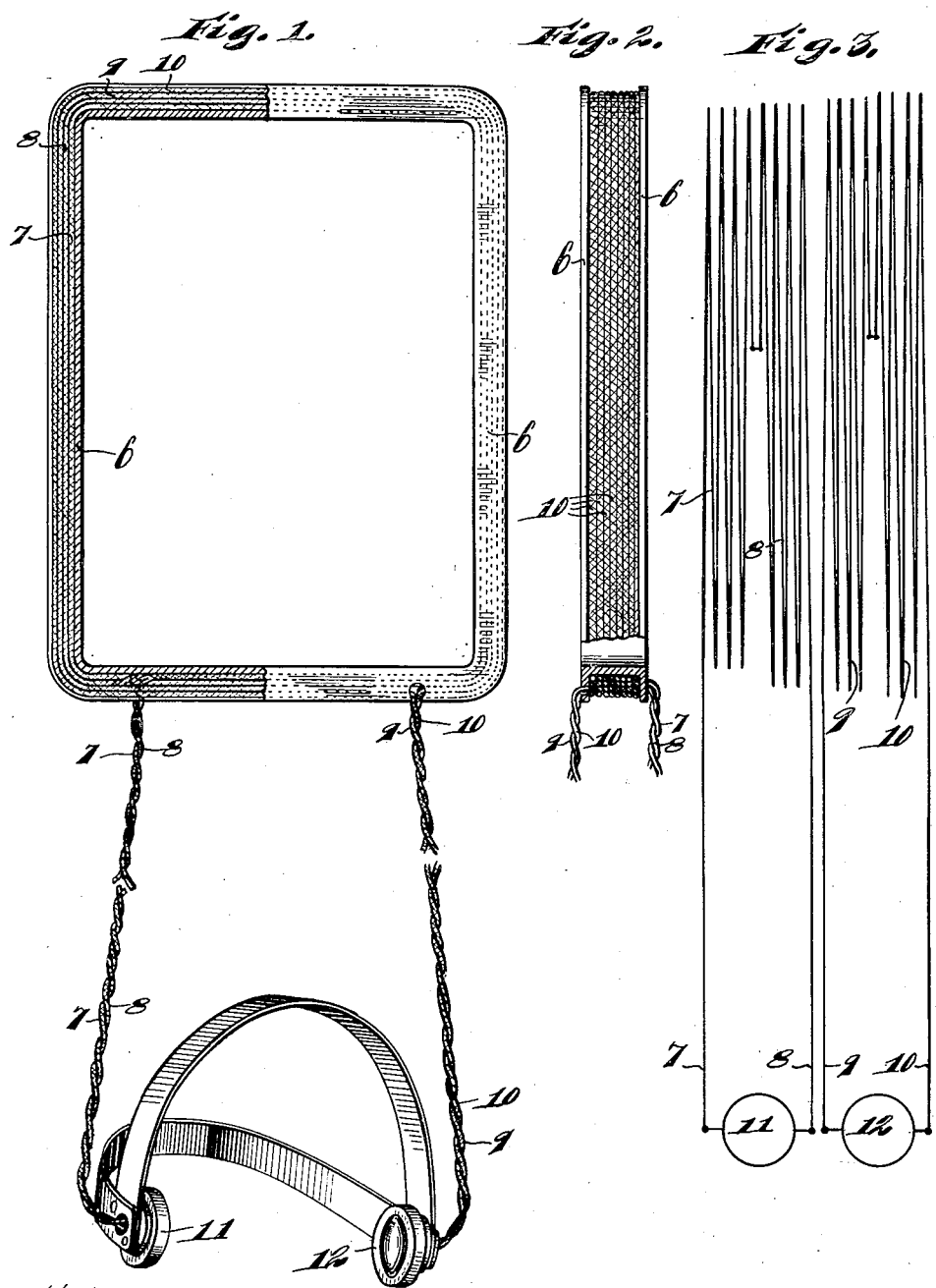

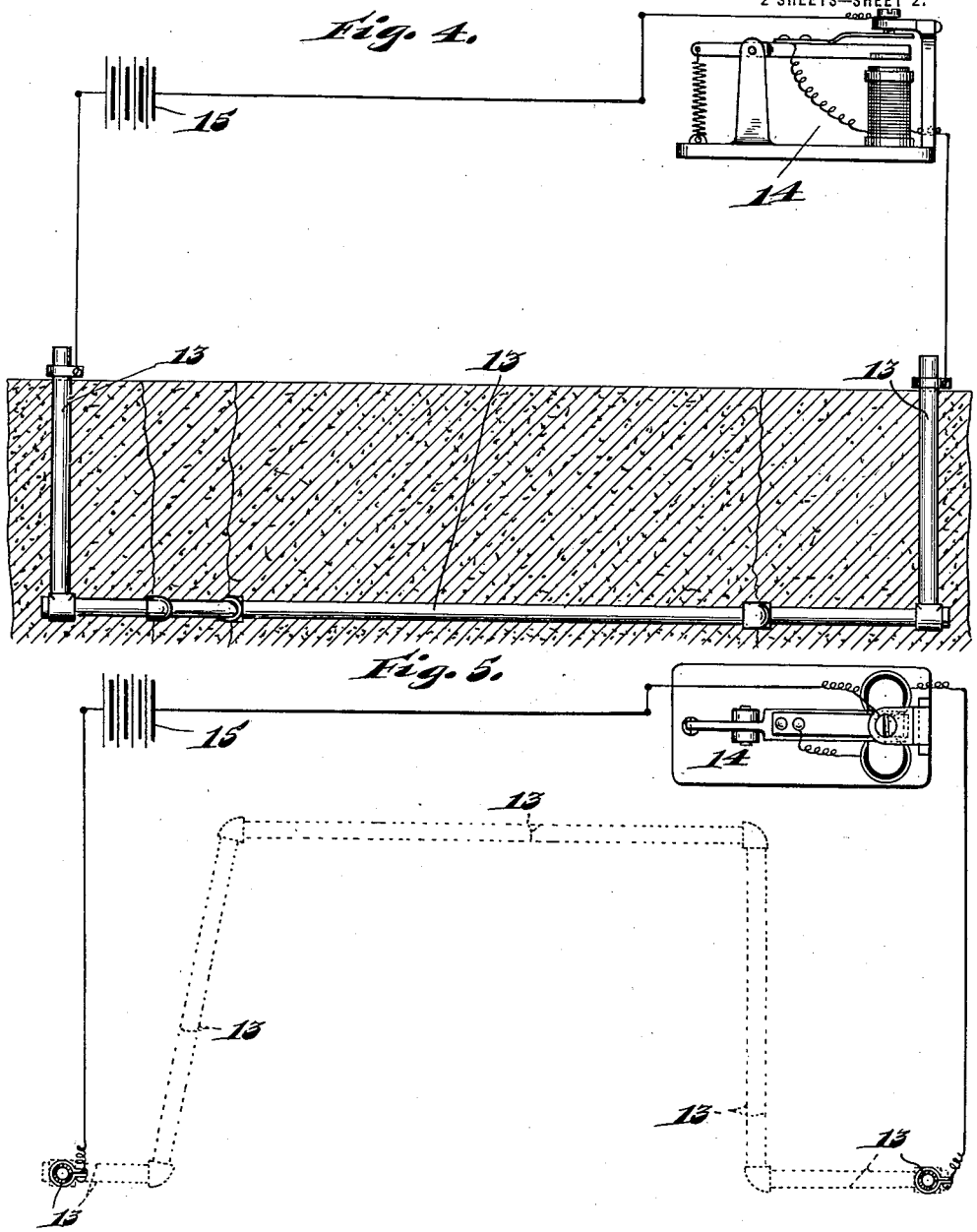

WILLIAM S. DARLEY, OF CHICAGO, ILLINOIS.

METHOD FOR LOCATING CONCEALED CONDUCTORS.

1,287,251.   Specification of Letters Patent.   Patented Dec. 10, 1918.

Application filed August 11, 1915. Serial No. 44,958.

*To all whom it may concern:*

Be it known that I, WILLIAM S. DARLEY, a citizen of the United States, and a resident of the city of Chicago, county of Cook, and State of Illinois, have invented certain new and useful Improvements in Methods for Locating Concealed Conductors, of which the following is a specification.

My invention relates to improvements in methods for locating concealed conductors, and has for its object the provision of improved means for this purpose whereby concealed conductors may be readily and expeditiously located.

The invention consists in the method and apparatus hereinafter described and claimed.

The invention will be best understood by reference to the accompanying drawings forming a part of this specification, and in which—

Figure 1 is a plan view, shown partially in section, of an exploring instrument employed in the method and Fig. 2, a side view of said instrument, Fig. 3, a diagrammatic view illustrating the method of connecting the electric coils employed in the exploring instrument, Fig. 4, a diagrammatic view illustrating a concealed conductor equipped with means for locating the same, and Fig. 5, a similar diagrammatic view illustrating the conductor in top plan view.

The preferred form of construction, as illustrated in the drawings, comprises a substantially rectangular frame 6 made of suitable insulating material and provided with a peripheral channel in which are wound electric coils 7, 8, 9 and 10 of insulated electric wire. Coils 7 and 8 are connected together in series with an ordinary wireless telegraph receiver 11. The coils 9 and 10 are similarly connected in series with an ordinary wireless telegraph receiver 12, such receivers being associated with a suitable head gear, as indicated in Fig. 1.

The concealed conductor 13 which is illustrated in Figs. 4 and 5, being an ordinary water pipe having a tortuous path under the earth has its exposed ends connected in series with an electric circuit breaker 14 and battery 15 by means of which an intermittent electric current will be passed through said conductor, as will be readily understood. This intermittent electric current induces an intermittent field in and around the space inclosed by said conductor. To locate the conductor, the receivers 11 and 12 are arranged at the ears of the operator and the frame 6 is held in the hands in a substantially horizontal position, that is with the axis of the coils vertical, and the operator walks around one of the exposed ends of conductor 13, holding the frame 6 in a substantially horizontal position. It will be found that each flow of current through the conductor 13 will produce a field which, cutting the coils 7, 8, 9 and 10 will produce a peculiar sound in the receivers 11 and 12, which is readily detected. When, however, the frame 6 is arranged parallel with the conductor and centrally thereover, that is with the axis of the coils 7, 8, 9 and 10 intersecting the conductor perpendicularly, these sounds will cease. When such a position for the frame 6 has been found, it may be verified by turning the frame on edge but maintaining its central line in the same position. If the position is correct, this position of the frame will produce maximum sounds at each flow of current. This test will give the operator the general direction of the concealed portion of conductor 13 and this should be followed up, holding the frame 6 in the first position but waving the same slightly from side to side. As long as the frame is thus carried and operated directly over but parallel with the conductor the sounds will cease as the center of the frame crosses a position immediately above the conductor, but will be present on either side of this position. When the conductor changes direction, this will be at once indicated by the fact that the sounds will be heard in any position in which the frame 6 is held. Then the new direction is found as before by walking in a circle around the point at which the absence of the sounds was last noted until another position is found in which absence of sound is noted. Then the course of the conductor is followed as before until another change in direction occurs or until the other end thereof is thus traced up. In this manner it will be found that concealed conductors such as water pipes and the like may be readily located when desired.

While I have illustrated and described the preferred form of apparatus and method of procedure for carrying my invention into effect, these are capable of variation and modification without departing from the spirit of my invention. I, therefore, do not wish to be limited to the exact details of construction and method of procedure set forth, but desire to avail myself of such variations and modifications as fall within the scope of the appended claim.

Having described my invention what I claim as new and desire to secure by Letters Patent is:

The method of locating concealed conductors which consists in passing an intermittent electric current through said conductor; moving an explorer, comprising an electric coil about in the induced field of the concealed conductor with the axis of the coil in position to intersect said conductor; and then turning said explorer until the axis of the coil is substantially perpendicular to and in a plane parallel with that of the axis of said conductor, substantially as described.

In testimony whereof I have signed my name to this specification in the presence of two subscribing witnesses.

WILLIAM S. DARLEY.

Witnesses:
JOSHUA R. H. POTTS,
HELEN F. LILLIS